United States Patent [19]

Fujikura

[11] Patent Number: 5,978,009
[45] Date of Patent: Nov. 2, 1999

[54] DRIVING CONTROL CIRCUIT FOR AN LED HEAD

[75] Inventor: Shuuichi Fujikura, Tokyo, Japan

[73] Assignee: Oki Electric Industry Co., Ltd., Tokyo, Japan

[21] Appl. No.: 08/943,852

[22] Filed: May 15, 1997

Related U.S. Application Data

[63] Continuation of application No. 08/135,100, Oct. 12, 1993, abandoned.

[30] Foreign Application Priority Data

Oct. 14, 1992 [JP] Japan .................................. 4-275638

[51] Int. Cl.[6] ........................................................ B41J 2/01
[52] U.S. Cl. ........................................................... 347/237
[58] Field of Search ................................... 347/240, 237, 347/131, 132; 382/268, 269, 271; 358/466, 298

[56] References Cited

U.S. PATENT DOCUMENTS

| 4,701,806 | 10/1987 | Takashima | 358/466 |
| 4,996,603 | 2/1991 | Kanemitsu et al. | 358/462 |
| 5,140,413 | 8/1992 | Suzuki et al. | 358/518 |
| 5,337,075 | 8/1994 | Takahashi et al. | 347/241 X |
| 5,384,591 | 1/1995 | Tsuda | 347/130 |

*Primary Examiner*—N. Le
*Assistant Examiner*—Michael Nghiem
*Attorney, Agent, or Firm*—Akin, Gump, Strauss, Hauer & Feld, L.L.P.

[57] ABSTRACT

An LED printer which forms a printed image by driving an LED head comprises a smoothing circuit in the LED head driving circuit the smoothing circuit forms interpolation lines by matching the original lines of the input data signal having a vertical resolution of 200 dpi with a given pattern and produce a print data signal of 400 dpi so as to improve the resolution of the printed image. The LED head driving circuit comprises a circuit for detecting the printing condition related to the image to be printed and producing a printing condition signal comprised of a line counter for detecting whether the line to be printed is the original line or the interpolation line, a transition counter point for counting the transition points of the input data signal between black and white dots, a dot counter for detecting the print density of the input data signal and a resolution detecting portion for detecting the resolution of the input data signal. The LED head driving circuit comprises a strobe signal generator, which previously stores therein a plurality of strobe signals related to the energizing periods of respective LED elements provided in the LED head for driving the same and selectively produces the strobe signal according to the printing condition related to the image to be printed based on the input data signal. The LED head drives each LED element based on the strobe signal to form an image.

10 Claims, 4 Drawing Sheets

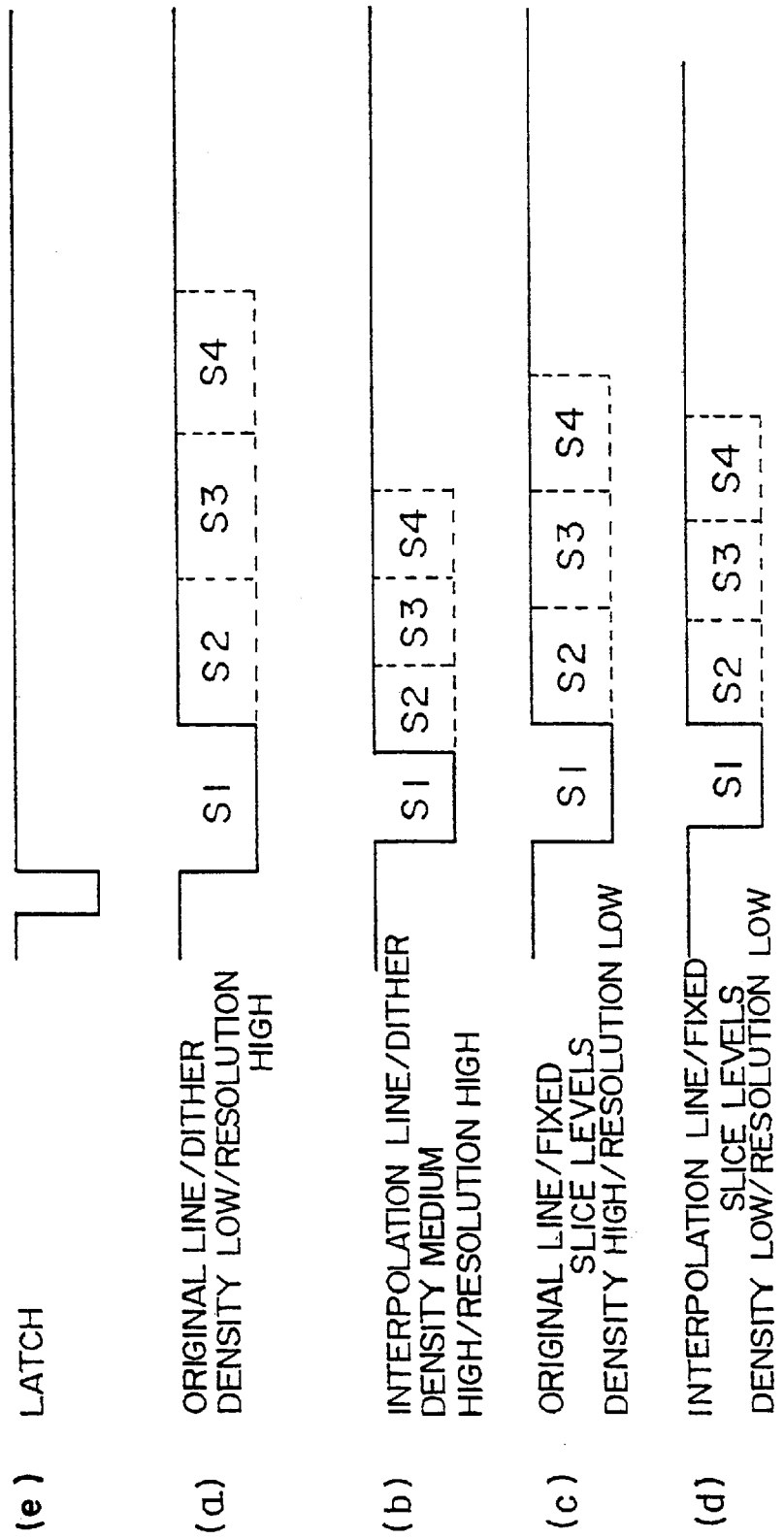

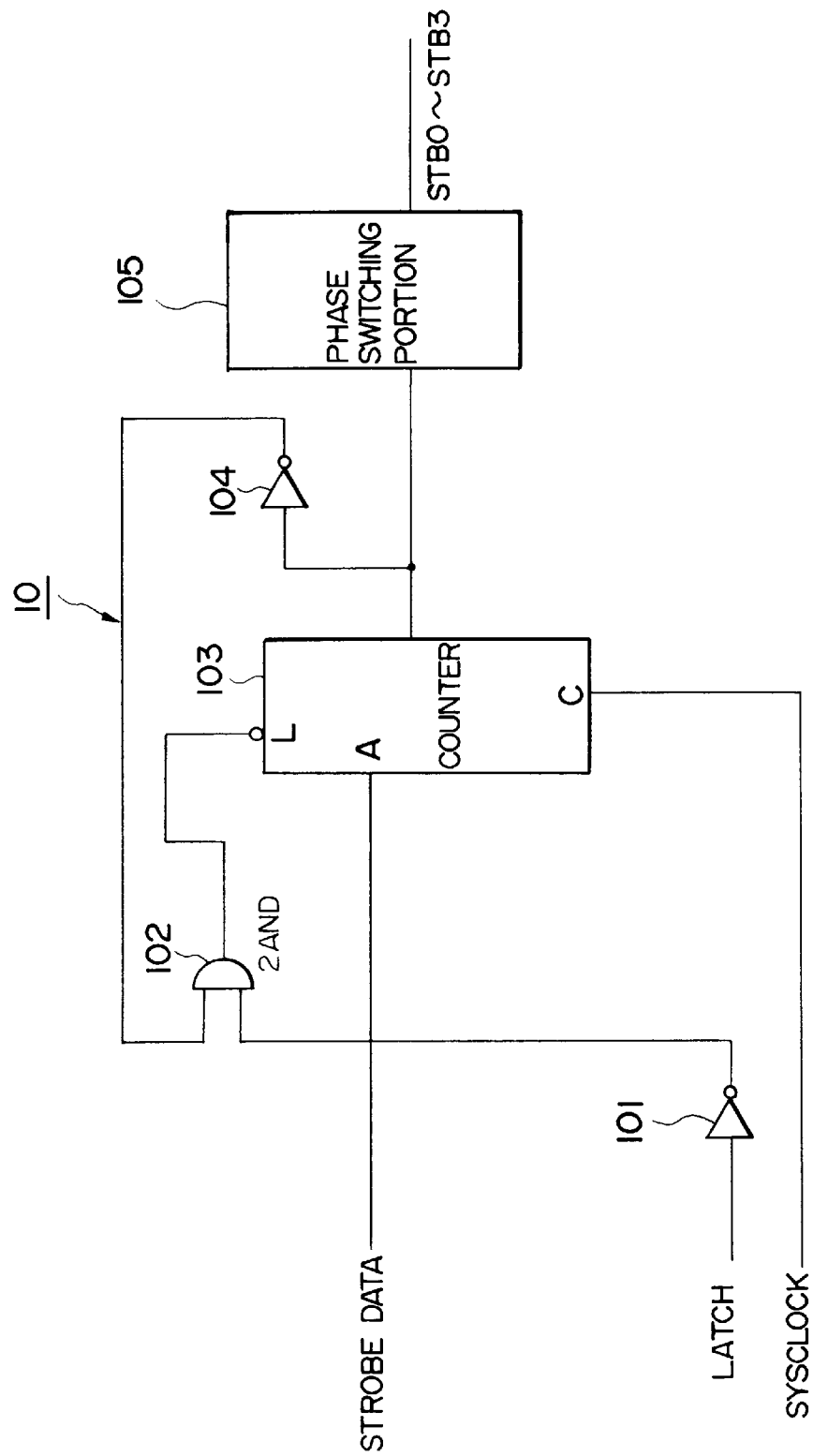

DRIVING CONTROL CIRCUIT FOR AN LED HEAD

This application is a continuation of Ser. No. 08/135,100, filed Oct. 12, 1993, abandoned.

BACKGROUND OF THE INVENTION

1. Field of the Invention

The present invention relates to a driving control circuit for an LED head in LED printers, particularly those for facsimile machines.

2. Description of the Prior Art

A conventional LED printer for printing a given character or figure on a recording paper using electrophotographic technology is equipped with an LED head comprising a plurality of LED elements arranged in a line, and each of the LED elements is energized corresponding to print data so as to emit light.

Dots each made by the light-emitting of each LED element form a print image.

The LED head comprises a plurality of register portions and a strobe generation circuit provided in the control portion of the printer supplies a strobe signal to each register portion to thereby restrain currents in each LED head.

Moreover, the LED printer comprises a smoothing circuit at the control portion thereof so as to form interpolation lines between original lines corresponding to the print data in order to enhance the resolution of print output.

That is, the smoothing circuit forms interpolation lines by interpolating black or white dots between original dots by matching an input data signal of M×N matrix with a previously set pattern.

For example, the smoothing circuit can perform A highly detailed printing, eliminating raggedness such as obliquely step-formed lines from a printed image by forming interpolation lines in the transferring direction of a recording paper so as to artificially supply print data of 200 dpi (dots per inch) to the LED head a pseudo print data of 400 dpi.

When printing is performed using the pseudo print data of 400 dpi formed by the smoothing circuit, the strobe generation circuit varies the strobe width for forming dots on interpolation lines from that for forming dots on original lines.

That is, the light-emitting of each LED element is reduced in intensity by shortening the strobe width for forming a dot on an interpolation line so as to form an electrostatic latent image corresponding to a small dot (i.e., a thin image).

Thus, it is possible to artificially improve resolution by interpolating input print data and making a printed image close to the original image the input data by forming the dots of original lines large and the dots of interpolation lines small.

However, when the smoothing circuit forms the interpolation line, white dots are liable to be formed in the interpolation line if black dots of the input data are not continuous to one another. As a result, when printing is performed after the interpolation lines are formed in the printed data, the printed image becomes thinner.

Whereas, when the black dots of the input print data are continuous to one another, black dots are liable to be formed in the interpolation line. As a result, when printing is performed after the interpolation lines are formed in the printed data, the printed image becomes darker.

Thus printer equipped with the smoothing circuit set forth above produces a thinner printed image from input data having a thin print image and a darker printed image from an input data having a dark print image so that the density of the printed image is varied from that of the original image.

When a printer used for a facsimile, a huge amount of print data has to be transferred in a short time so that the amount of each print data is reduced, resulting in the transference of print data of low resolution.

Such print data which vary in resolution causes different printed results and consequently the deteriorated quality of printed images.

Print data of low resolution can be interpolated by the smoothing means to be artificially improved in resolution. However, when print data of high resolution which has been received is interpolated similarly, the print data to be supplied to the LED head becomes too much and takes too much time in transference, so that the LED head cannot be driven in time.

SUMMARY OF THE INVENTION

It is the first object of the present invention to provide a driving control circuit of an LED head capable of forming a printed image of high resolution in an LED printer.

It is the second object of the present invention to provide a driving control circuit for an LED head capable of printing a print image of high resolution at a stable print density corresponding to that of the input print data.

It is the third object of the present invention to provide a driving control circuit of an LED head which does not deteriorate the quality of the printed image regardless of the different resolutions of input print data.

The above objects are attained by an LED head driving control circuit of the present invention comprising the following components.

An LED head equipped with a plurality of LED elements;
a smoothing means which produces a print data signal which has been converted from an input data signal in accordance with a preset pattern;
a printing condition signal output means which detects a printing condition related to an image to be printed according to the input data signal and produces a printing condition signal; and
a strobe signal generation means which previously stores therein a plurality of strobe data related to the energizing period for driving the LED elements of the LED head, selects strobe data based on the printing condition signal and produces a strobe signal corresponding to the selected strobe data; wherein
the LED head drives the LED elements based on the strobe signal.

BRIEF DESCRIPTION OF THE DRAWINGS

FIG. 4 is a diagram exemplifying a strobe data in a table RAM in FIG. 1; and

FIG. 5 is a circuit diagram of a strobe generation circuit in FIG. 1.

DETAILED DESCRIPTION OF THE PREFERRED EMBODIMENT

An LED printer for printing a given character or figure on a recording paper using electrophotographic technology comprises an electrostatic charging unit, an exposure unit, a developing unit, a transfer unit and a fixing unit.

The electrostatic charging unit charges a photosensitive drum with electricity at a given potential.

The exposure unit performs exposure by applying the light emitted by the LED head thereof to the photosensitive drum to form an electrostatic latent image thereon.

The electrostatic latent image on the photosensitive drum is developed by the developing unit so as to form a toner image thereon.

The toner image is further transferred onto a recording paper by the transfer unit and is fixed thereon by the fixing unit.

The LED head comprises a plurality of LED elements arranged in a line and an LED head driving control circuit controls the energizing of each LED element for light-emitting.

The embodiments of the present invention will be described hereinafter with reference to drawings.

Figure 1:
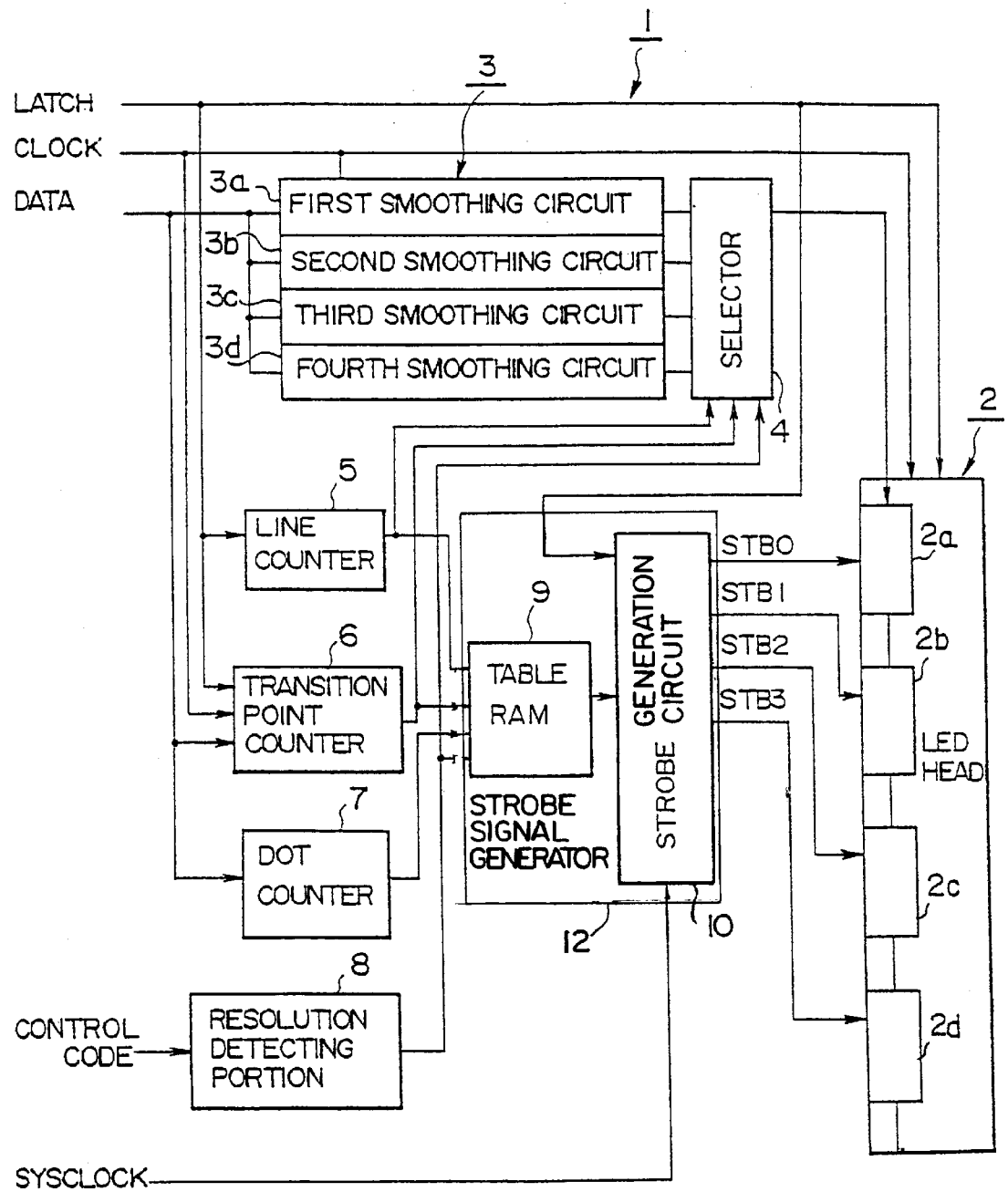
FIG. 1 is a schematic diagram showing a driving control circuit of an LED head according to the present invention.

In FIG. 1, an LED head driving control circuit 1 comprises an LED head 2 which has a plurality of LED elements and four register portions 2a to 2d for restraining currents in each of the LED elements, a smoothing means 3 which is composed of a first smoothing circuit 3a, a second smoothing circuit 3b, a third smoothing circuit 3c and a fourth smoothing circuit 3d, a selector 4 which selectively outputs output signals from the smoothing means 3, a line counter 5 which produces a line signal related to a printing line, a transition point counter 6 which produces an image decision signal related to an image of the input data signal, a dot counter 7 which produces a print density signal related to the print density of the input data signal, a resolution detecting portion 8 which produces a resolution signal related to the resolution of the input data signal, a table RAM 9 which previously stores therein strobe data related to the energizing periods of the LED elements to be supplied to the register portions 2a to 2d of the LED head 2 and a strobe generation circuit 10 which produces a strobe signal based on the strobe data in the table RAM 9. Together, the RAM 9 and the strobe generation circuit 10 define a strobe signal generation means (i.e. strobe signal generator 12).

Each of the first to fourth smoothing circuits 3a to 3d of the smoothing means 3 has a smoothing pattern which corresponds to a printing condition different from the others.

The first smoothing circuit 3a has a smoothing pattern of the fixed slice level method which converts an input data having 200 dpi vertical resolution into that having 400 dpi vertical resolution.

The second smoothing circuit 3b has a smoothing pattern of the dither method which converts an input data having 200 dpi vertical resolution into that having 400 dpi vertical resolution.

The third smoothing circuit 3c has a smoothing pattern of the fixed slice level method which converts an input data having 100 dpi vertical resolution into that having 400 dpi vertical resolution.

The fourth smoothing circuit 3d has a smoothing pattern of the dither method which converts an input data having 100 dpi resolution into that having 400 dpi resolution.

The smoothing means 3 performs data conversion by referring to the input data signal DATA of M×N matrix supplied from a central unit and converting the same according to a preset pattern.

For example, 3×2 matrix data (data of two original lines each containing 3 dots) is converted into 3×3 matrix data or 3×5 matrix data by interpolating black or white dots therebetween according to a given pattern.

That is, when the smoothing means 3 forms an interpolating line from two original lines, it produces 3×3 matrix data, while when it forms three interpolating lines, it produces 3×5 matrix data.

Figure 2:
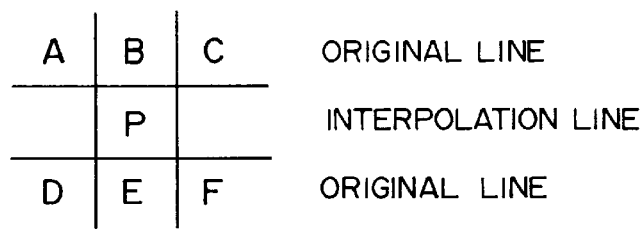
FIG. 2 is a table for exemplifying the algorithm of a smoothing process by a smoothing circuit in FIG. 1.

FIG. 2 is a view for explaining the algorithm of the smoothing process in the smoothing means 3, wherein 3×3 matrix data is formed from 3×2 matrix data.

In FIG. 2, denoted at A~C and D~F are dots of the original lines of 3×2 matrix in the input data, while denoted at P is a dot in an interpolation line added by the smoothing process.

Each dot is composed of logical "1" (black dot) or logical "0" (white dot), and dot P is determined by the following formula.

$$P = A \times E \times F + C \times D \times E + B(D+E+F)$$

The smoothing means 3 forms a print data signal of pseudo 400 dpi by forming three interpolating lines when the input data signal has a resolution of 100 dpi and forms a print data signal of pseudo 400 dpi by forming an interpolating line when the input data signal has a resolution of 200 dpi.

In this way, it is possible to print a highly detailed print image eliminating raggedness in the oblique stepped lines of printed character etc. by way of the smoothing means 3 which artificially improves resolution by adding the data signal of interpolation lines to the input data signal.

The line counter 5 receives a latch signal LATCH (FIG. 4(e)) for changing lines from a central unit and decides whether the line to be printed by the LED head 2 is an original line or an interpolation line added by the smoothing means 3 based on the latch signal LATCH.

Thereafter the line counter 5 supplies a line signal indicating whether it is an original line or an interpolation line to the selector 4 and the table RAM 9.

For example, when the smoothing means 3 forms three interpolation lines in the input data signal DATA, the line signal produced by the line counter 5 is composed of four kinds of signals of an original line, a first interpolation line, a second interpolation line and a third interpolation line.

When the smoothing means 3 forms an interpolation line, the line signal is composed, two kinds of signals of the original line and the first interpolation line.

The transition point counter 6 counts the changes from a black dot to a white dot and those from a white dot to a black dot (the number of transitions between black and white dots) on reception of the input data signal DATA.

Figure 3:
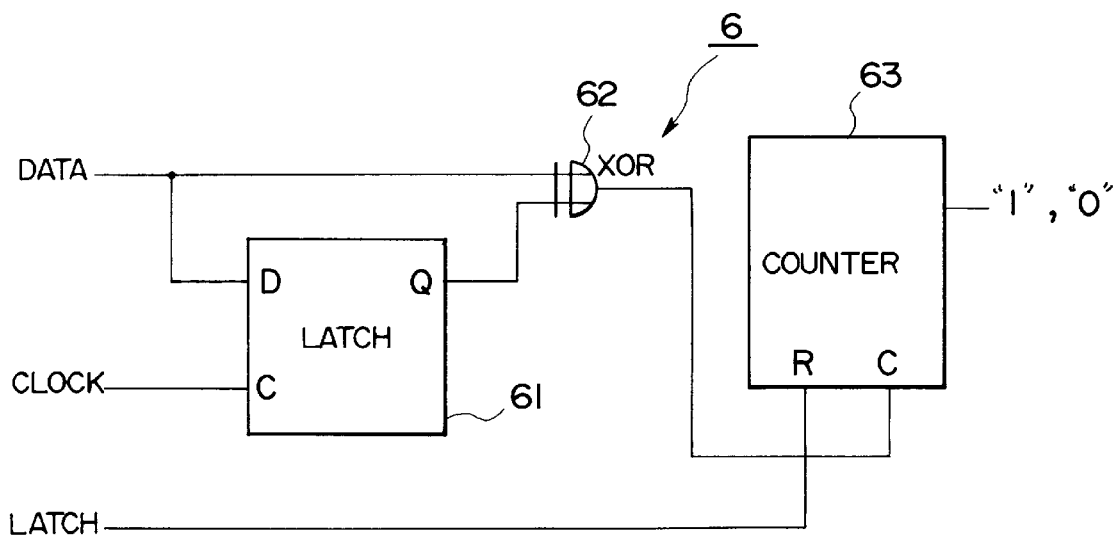
FIG. 3 is a circuit diagram of a transition counter in FIG. 1.

FIG. 3 shows the circuit diagram of the transition counter 6.

In FIG. 3, denoted at 61 is a flip-flop circuit, 62 is an exclusive OR (XOR) circuit and 63 is a counter.

The filp-flop circuit 61 receives a data signal DATA and produces a data signal preceding the same (the data signal of the preceding dot) DATA' in synchronism with a clock signal CLOCK supplied by the central unit.

The exclusive OR circuit 62 receives the data signal DATA and the preceding data signal DATA' produced by the flip-flop circuit 61.

The exclusive OR circuit 62 produces a logical "1" when the data signal DATA is different from the preceding data signal DATA', i.e. the input data signal transits from black to white or from white to black.

The data produced by the exclusive OR circuit 62 is supplied to the counter 63 to be counted thereby.

The counter 63 a produces logical "1" when the counted number exceeds a preset number (e.g. "512").

When the number counted by the counter 63 exceeds the preset number, it means that there are many dot transition points, i.e., the input data contains many portions where dots are not continuous to one another (uncontinuous portions).

When there are many uncontinuous portions of dots, the input data signal is generally an image data best suited for the dither method.

The counter 63 produces logical a "0" when the counted number does not exceed the preset number.

When there are few uncontinuous portions, the input data signal is generally an image data suited for the fixed slice level method.

Accordingly, the transition counter 6 decides whether the input data signal DATA is an image data for the dither method or that for the fixed slice level method and supplies an image decision signal composed of one of the two kinds of signals to the selector 4 and the table RAM 9.

The dot counter 7 receives the data signal DATA to count black dots in the data of a line to thereby determine the print density.

That is, the dot counter 7 classifies the density of the input data signal DATA into four print densities, high, medium high, medium low and low according the ratio of black dots in the whole dots of a line.

Then the dot counter 7 supplies one of four print density signals corresponding to the four of print densities, i.e. high, medium high, medium low and low, to the table RAM 9.

The resolution detecting portion 8 detects the resolution of the input data signal.

For example when a printer is used in a facsimile machine, the data signal to be printed is transferred together with a control code representing the resolution thereof from the supply side.

When standard resolution (e.g. 100 dpi) is selected on the supply side the printer used in a facsimile machine receives a DCS signal indicating the resolution and when high resolution (e.g. 200 dpi) is selected on the supply side it receives an NSF signal indicating the resolution.

The resolution detecting portion 8 decides the resolution of the input data signal on the basis of the input control code (DCS signal or NSF signal) and supplies a resolution signal indicating either of 100 dpi and 200 dpi to the selector 4 and the table RAM 9.

The selector 4 receives a line signal from the line counter 5, an image decision signal from the transition counter 6 and a resolution signal from the resolution detecting portion 8.

The selector 4 selects one of the smoothing print data signals from the first to fourth smoothing circuits 3a to 3d according to the three received signals set forth above and supplies the selected smoothing print data signal to the LED head 2.

The table RAM 9 previously stores therein a plurality of strobe data related to the energizing periods of LED elements.

The table RAM 9 receives the line signal from the line counter 5, the image decision signal from the transition counter 6, the print density signal from the dot counter 7 and the resolution signal from the resolution detecting portion 8 strobe data selects particular from the stored strobe data on the basis of the received signals and supplies a signal corresponding to the selected strobe data signal to the strobe generation circuit 10.

FIG. 4 exemplifies a strobe data signal produced by the table RAM 9.

FIG. 4 (a) shows a strobe data signal when the line signal is the original line, the image decision signal is the system-atic dither, the print density signal is low and the resolution signal is 200 dpi.

FIG. 4 (b) shows a strobe data signal when the line signal indicates the interpolation line, the image decision signal indicates the dither method, the print density signal is medium high and the resolution signal is 200 dpi. FIG. 4 (c) shows a strobe data signal when the line signal indicates the original line, the image decision signal indicates the fixed slice level method, the print density signal is high and the resolution signal is 100 dpi and FIG. 4 (d) shows a strobe data signal when the line signal indicates the interpolation line, the image decision signal indicates the fixed slice level method, the print density signal is low and the resolution signal is 100 dpi.

In FIGS. 4 (a) to 4 (d), denoted at S1 is the strobe width of the strobe signal STB0, S2 is that of the strobe signal STB1, S3 is that of the strobe signal STB2 and S4 is that of the strobe signal STB3.

As evident from these figures, when the dither method is selected the strobe width P2 of the interpolation line is shorter than the strobe width P1 of the original line and the difference therebetween is large.

Whereas when the fixed slice level method is selected, the difference between the strobe width P2 of the interpolation line and the strobe width P1 of the original line is small.

The table RAM 9 selects the optimum strobe data meeting the conditions of the line signal, image decision signal, print density signal and resolution signal respectively.

That is, the table RAM 9 selects the long strobe width when the line signal indicates the original line, while the short strobe width when the line signal indicates the interpolation line.

Thus, it is possible to practically print an image which is close in shape to the original image of the input data by forming the dots on the original line large (dark) and the dots on the interpolation line small (thin).

The table RAM 9 selects a larger strobe width in the original line and a smaller strobe width in the interpolation line by increasing the difference between the strobe widths of the original line and the interpolation line when the image decision signal indicates the dither method is selected (i.e. there are many portions where the dots are not continuous to one another). The table RAM 9 decreases the difference between the strobe widths of the original line and the interpolation line when the image decision signal indicates the fixed slice level method is selected (i.e. there are many portions where the dots are continuous).

As a result, when an input data signal indicating the dither method is selected wherein black dots are not continuous to one another is subjected to the smoothing process, a printed image is not so influenced by the white dots in the interpolation line although the dots formed in the interpolation line are liable to be white.

On the other hand, when the input data signal indicates the fixed slice level method is selected, the printed image is influenced by the smoothing effect since the dots of the original line and those of the interpolation line are printed with respective strobe widths which are not so different from each other.

The table RAM 9 selects a short strobe width when the print density signal is high (i.e. the ratio of black dots in a line is high) while a long strobe width when the print density signal is low.

The table RAM 9 selects a short strobe width for the interpolation line when the resolution signal corresponding to the vertical resolution of the input data signal indicates 200 dpi and selects a short strobe width for the first and third interpolation lines and a long strobe width for the second interpolation line of the three interpolation lines when the vertical resolution signal indicates 100 dpi.

The strobe generation circuit 10 operates in synchronism with the system clock SYSCLOCK from the central unit and produces strobe signals STB0 to STB3 having a strobe width corresponding to the strobe data from the table RAM 9.

FIG. 5 is a circuit diagram of the strobe generation circuit.

In FIG. 5, denoted at 101 is an inverter circuit, 102 is an AND (2AND) circuit, 103 is a counter, 104 is an inverter circuit and 105 is a phase switching portion.

The counter 103 receives the strobe data signal from the table RAM 9 and set a starting number according to the strobe data, i.e. the strobe width of the strobe data signal as illustrated in FIG. 4.

The counter 103 counts up in synchronism with the system clock SYSCLOCK starting at the starting number and produces a carry signal when it counts up to a give number.

The phase switching portion 105 is composed of shift registers which successively switch the phases of the strobe signals STB0 to STB3 according to the carry signal.

That is, the counting time of the counter 103 up to the given number is varied according to the starting number which is set in accordance with the strobe width of the strobe data signal, to thereby vary the strobing period for driving the LED elements of the LED head 2.

The latch signal LATCH from the inverter circuit 101 and the carry signal from the inverter circuit 104 are supplied to the AND circuit 102.

The counter 103 sets a starting number corresponding to the strobe data signal based on the load signal from the AND circuit 102.

The LED head 2 comprises LED elements arranged in a line (not shown) wherein each LED element is energized according to the print data from the selector 4 so as to emit light.

The LED head 2 comprises four register portions 2a to 2d. The strobe signals STB0 to STB3 which are successively produced by the strobe generation circuit 10 are supplied to the register portions 2a to 2d respectively.

Each of the register portions 2a to 2d of the LED head 2 is composed of shift registers and latch circuits (not shown).

The print data produced from the selector 4 is successively supplied to the shift registers in synchronism with the clock signal CLOCK, and when the latch circuit receives a latch signal LATCH, the print data stored in the shift registers are latched by the latch circuits.

The LED elements corresponding to the latched print data is energized to emit light.

Since the LED elements are energized according to the strobe signals STB0 to STB3 from the strobe generation circuit 10, a photosensitive drum (not shown), is irradiated during the time which corresponds to the strobe width of the strobe signal so as to form an electrostatic latent image of a dot having a given size thereon.

What is claimed is:

1. A driving control circuit comprising:
   a print head having a plurality of energizing elements;
   a plurality of smoothing circuits receiving an input data signal corresponding to a plurality of original lines of black dots and white dots, each of the plurality of smoothing circuits having a different smoothing pattern, an input receiving the input data signal and an output providing a print data signal, the print data signal corresponding to a plurality of original lines of the input data signal and at least one interpolation line of black dots and white dots formed between each of the plurality of original lines, each of the plurality of smoothing circuits forming each interpolation line according to the smoothing pattern of the respective smoothing circuit;
   a resolution detector having an input receiving a print resolution signal, the resolution detector detecting a resolution of each of the plurality of original lines from the print resolution signal and having an output providing a detected resolution signal corresponding to the detected resolution of each of the plurality of original lines;
   a selector having a plurality of print data signal inputs, each of the plurality of print data signal inputs receiving the print data signal from a respective smoothing circuit, the selector also having an input receiving the detected resolution signal from the resolution detector, the selector selecting one of the received print data signals as a selected print data signal according to the detected resolution signal and having an output providing the selected print data signal to the print head;
   a line counter having an input receiving a current line signal, the line counter determining from the current line signal whether a current data line is an original line or an interpolation line and having an output providing a determined line signal corresponding to the determination; and
   a strobe signal generator having an input receiving the determined line signal and at least one output providing a strobe signal having a duration set according to the determined line signal, the strobe signal energizing the energizing elements of the print head a longer time period P1 for an original line and a shorter time period P2 for an interpolation line.

2. The driving control circuit of claim 1 wherein the plurality of smoothing circuits include a first smoothing circuit having a first smoothing pattern based on a fixed slice level smoothing method, and a second smoothing circuit having a second smoothing pattern based on a dither smoothing method.

3. The driving control circuit of claim 2 further comprising a transition counter having an input receiving the input data signal, the transition counter producing a count of transitions between successive black dots and white dots in each of the plurality of original lines from the input data signal, and comparing the count with a predetermined number, the transition counter having an output providing a decision signal, the decision signal being in a first state when the count is below the predetermined number to indicate that the selector should select the print data signal from the first smoothing circuit, the decision signal being in a second state when the count is above the predetermined number to indicate that the selector should select the print data signal from the second smoothing circuit, the selector having an input receiving the decision signal from the transition counter and selecting one of the received print data signals as a selected print data signal according to the detected resolution signal and the decision signal.

4. The driving control circuit of claim 3 wherein the strobe signal generator further has an input receiving the decision signal from the transition counter, the strobe signal generator providing the strobe signal having the longer time period P1 and the shorter time period P2 which have a large difference value (P1–P2) for the dither smoothing pattern or which have a small difference value for the fixed slice level smoothing pattern according to the decision signal.

5. The driving control circuit of claim 1 wherein the strobe signal generator further comprises a memory storing a plurality of strobe data and outputting the strobe data corresponding to the determined line signal from the line counter and a strobe generation circuit producing the strobe signal according to the strobe data output from the memory.

6. The driving control circuit of claim 1 further comprising a dot counter having an input receiving the input data signal and an output providing a print density signal to the strobe signal generator, the dot counter counting the black dots in each of the plurality of original lines, detecting a print density of the input print data based on the counted number, and producing the print density signal based on the detected print density, the strobe signal generator providing the strobe signal having the longer time period P1 and the shorter time period P2 which are increased respectively when the print density is below a preset value or which are decreased respectively when the detected print density is above the preset value according to the print density signal.

7. A driving control circuit comprising:
a print head having a plurality of energizing elements;
a plurality of smoothing circuits receiving an input data signal corresponding to a plurality of original lines of black dots and white dots, each of the plurality of smoothing circuits having a different smoothing pattern, an input receiving the input data signal and an output providing a print data signal, the print data signal corresponding to a plurality of sequential data lines, the data lines including each of the plurality of original lines of the input data signal and at least one interpolation line of black dots and white dots formed between each of the plurality of original lines, each of the plurality of smoothing circuits forming each interpolation line according to the smoothing pattern of the respective smoothing circuit;
a resolution detector having an input receiving a print resolution signal, the resolution detector detecting a resolution of each of the plurality of original lines from the print resolution signal and having an output providing a detected resolution signal corresponding to the detected resolution of each of the plurality of original lines;
a selector having a plurality of print data signal inputs, each of the plurality of print data signal inputs receiving the print data signal from a respective smoothing circuit, the selector also having an input receiving the detected resolution signal from the resolution detector, the selector selecting one of the received print data signals as a selected print data signal according to the detected resolution signal and having an output providing the selected print data signal to the print head;
a dot counter having an input receiving the input data signal, the dot counter counting the black dots in each of the plurality of original lines, detecting a print density of the input print data based on the counted number, and having an output providing a print density signal based on the detected print density; and
a strobe signal generator having an input receiving the print density signal and at least one output providing a strobe signal having a duration set according to the print density signal, the strobe signal energizing the energizing elements of the print head a period of time for each data line, the period of time being increased when the detected print density is below a preset value and being decreased when the detected print density is above the preset value.

8. The driving control circuit of claim 7 wherein the plurality of smoothing circuits include a first smoothing circuit having a first smoothing pattern based on a fixed slice level smoothing method, and a second smoothing circuit having a second smoothing pattern based on a dither smoothing method.

9. The driving control circuit of claim 8 further comprising a transition counter having an input receiving the input data signal, the transition counter producing a count of transitions between successive black dots and white dots in each of the plurality of original lines from the input data signal, and comparing the count with a predetermined number, the transition counter having an output providing a decision signal, the decision signal being in a first state when the count is below the predetermined number to indicate that the selector should select the print data signal from the first smoothing circuit, the decision signal being in a second state when the count is above the predetermined number to indicate that the selector should select the print data signal from the second smoothing circuit, the selector having an input receiving the decision from the transition counter and selecting one of the received print data signals as a selected print signal according to the detected resolution signal and the decision signal.

10. The driving control circuit of claim 7 wherein the strobe signal generator further comprises a memory storing a plurality of strobe data and outputting the strobe data corresponding to the print density signal from the dot counter and a strobe generation circuit producing the strobe signal according to the strobe data output from the memory.

* * * * *